United States Patent
Patel

(10) Patent No.: US 12,271,480 B2
(45) Date of Patent: Apr. 8, 2025

(54) INFORMATION HANDLING SYSTEMS AND RELATED METHODS TO PREVENT TAMPERING AND VERIFY THE INTEGRITY OF NON-VOLATILE DATA STORED WITHIN NON-VOLATILE MEMORY

(71) Applicant: DELL PRODUCTS L.P., Round Rock, TX (US)

(72) Inventor: Sharvil Patel, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 511 days.

(21) Appl. No.: 17/486,678

(22) Filed: Sep. 27, 2021

(65) Prior Publication Data
US 2023/0094673 A1 Mar. 30, 2023

(51) Int. Cl.
*G06F 21/57* (2013.01)
*G06F 21/60* (2013.01)

(52) U.S. Cl.
CPC .......... *G06F 21/575* (2013.01); *G06F 21/602* (2013.01)

(58) Field of Classification Search
CPC .............................. G06F 21/575; G06F 21/602
See application file for complete search history.

(56) References Cited

U.S. PATENT DOCUMENTS

2006/0107032 A1* 5/2006 Paaske .................... G06F 21/57 713/2
2013/0124840 A1* 5/2013 Diluoffo ............... G06F 21/575 713/2
2018/0075242 A1* 3/2018 Khatri .................... H04L 9/3263
2020/0042710 A1* 2/2020 Liu ........................ G06F 21/575
2021/0034733 A1* 2/2021 Grobelny ................ G06F 21/44

OTHER PUBLICATIONS

Dell Technologies Whitepaper, "Client Solutions Dell Trusted Device: BIOS Security", Sep. 2020, 30 pgs.
Microsoft Docs, "Secure Boot", Jan. 11, 2021, 4 pgs.
Microsoft Docs, "Secure The Windows 10 Boot Process", Nov. 16, 2018, 9 pgs.
Marando et al., "Defending Against Rootkit Attacks And Avoiding Malicious Malware", Microchip.com; Jun. 30, 2020, 4 pgs.
Intel, "Intel Boot Guard", Captured from Internet Sep. 9, 2021, 6 pgs.

(Continued)

*Primary Examiner* — Benjamin E Lanier
*Assistant Examiner* — Zoha Piyadehghibi Tafaghodi
(74) *Attorney, Agent, or Firm* — Egan, Enders & Huston LLP.

(57) ABSTRACT

Various embodiments of information handling systems (IHS) and related methods are provided to prevent tampering and verify the integrity of non-volatile data stored within non-volatile memory, such as but not limited to non-volatile random access memory (NVRAM). More specifically, information handling systems and methods are provided herein to: (a) prevent tampering of non-volatile data stored within non-volatile memory by preventing unauthorized write operations to the non-volatile memory, and either (b) verify the integrity of the non-volatile data read from the non-volatile memory, or (c) detect tampering, if the integrity of the non-volatile data cannot be verified.

24 Claims, 7 Drawing Sheets

(56) References Cited

OTHER PUBLICATIONS

Wikipedia, "Intel VPro", Captured from Internet Sep. 17, 2021, 14 pgs.
Intel, "Intel Boot Guard", Aug. 12, 2015, 2 pgs.
Cooper et al., "BIOS Protection Guidelines, National Institute Of Standards And Technology", Apr. 2011, 20 pgs.
Zimmer et al., Intel, "Establishing The Root Of Trust", Aug. 2016, 5 pgs.

* cited by examiner

INFORMATION HANDLING SYSTEMS AND RELATED METHODS TO PREVENT TAMPERING AND VERIFY THE INTEGRITY OF NON-VOLATILE DATA STORED WITHIN NON-VOLATILE MEMORY

FIELD

This invention relates generally to information handling systems (IHSs), and more particularly, to systems and methods that may be used to ensure that data written to non-volatile memory has not been tampered with.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) typically include a boot system such as, for example, a Basic Input/Output System (BIOS) or Unified Extensible Firmware Interface (UEFI). The boot system code is generally implemented as boot firmware, which is stored in non-volatile memory, such as read only memory (ROM), non-volatile random access memory (NVRAM) and/or Flash memory. Upon system start-up or reboot, a processing device (such as a host processor and/or an embedded controller) may execute program instructions within the boot firmware to test and initialize the IHS hardware components, perform a Power-On Self-Test (POST) to ensure the hardware configuration is valid and working properly, and load an operating system (OS) from a computer readable storage device into system memory. Additional boot services may also be available for execution when the boot firmware owns the system platform during a pre-boot phase before the OS is loaded and running. Once the OS assumes control of the system platform, the boot system may continue to provide runtime services for the operating system and other application programs executed in the OS environment.

Non-volatile memory (such as ROM, NVRAM and Flash memory) is critical to the information handling system boot process. In conventional information handling systems, however, data stored within non-volatile memory is not secured and can be compromised by malicious actors. In some cases, for example, an authenticated BIOS interface using public key infrastructure (PKI) to authenticate manageability commands may store public key data within NVRAM, so that it can be subsequently used to verify signatures generated by a private counterpart. Because the data stored within NVRAM is not secured or protected against tampering, a malicious actor can write their own public key data to the NVRAM (using, e.g., a DXE driver or runtime driver). Since there is currently no way to prevent an unauthorized write operation to NVRAM, the public key data provided by the malicious actor would be accepted. The malicious actor could then send a remote configuration command (e.g., a remote data-wipe command) signed by their own private key to the information handling system. The remote configuration command would be executed because the driver performing signature verification does not have the capability to determine if the public key data stored within the NVRAM has been tampered with.

In another example, a malicious actor could tamper with BIOS configuration data stored within NVRAM. Like the public key data example mentioned above, any modifications made to the BIOS configuration data by the malicious actor would be written to NVRAM, since there is currently no method available to prevent unauthorized write operations to the NVRAM. When the information handling system is rebooted, the modified BIOS configuration data would be retrieved from NVRAM and used to configure the BIOS, potentially putting the system in a less secure state. For example, a malicious actor could modify BIOS configuration to disable security configurations (such as Secure Boot), change password requirements, enable pre-boot ports (which may put the system in a undesired security state), turn off other security features (such as, e.g., Intel VT-d) and more.

SUMMARY OF THE INVENTION

The following description of various embodiments of information handling systems and related methods is not to be construed in any way as limiting the subject matter of the appended claims.

According to various embodiments of the present disclosure, information handling systems and methods are provided herein to prevent tampering and verify the integrity of non-volatile data stored within non-volatile memory. More specifically, information handling systems and methods are provided herein to: (a) prevent tampering of non-volatile data stored within non-volatile memory by preventing unauthorized write operations to the non-volatile memory, and either (b) verify the integrity of the non-volatile data read from the non-volatile memory, or (c) detect tampering, if the integrity of the non-volatile data cannot be verified.

The embodiments disclosed herein use a hash-based message authentication code (HMAC) to detect tampering of the non-volatile data written to non-volatile memory by a data owner, or verify the integrity of non-volatile data read from the non-volatile memory. All write operations to the non-volatile memory are accompanied by an HMAC calculation of the non-volatile data, which was written to the non-volatile memory by the data owner. To prevent tampering, all write operations are confirmed with the data owner before writing the non-volatile data and the HMAC of the data to the non-volatile memory. During read operations, the HMAC of the non-volatile data read from non-volatile memory is recalculated and compared to the HMAC stored within the non-volatile memory to either verify the integrity of the non-volatile data read from the non-volatile memory or detect tampering of the non-volatile memory data stored therein.

According to one embodiment, an information handling system (IHS) in accordance with the present disclosure may generally include a non-volatile memory, a computer readable memory and at least one processing device. The computer readable memory may store boot firmware and a plurality of boot firmware drivers, including trusted boot firmware drivers, untrusted boot firmware drivers and a property service driver. The at least one processing device may be configured to execute program instructions within the boot firmware when the IHS is powered on or rebooted to initialize a system platform of the IHS, load the plurality of boot firmware drivers and launch a bootloader to load an operating system (OS) for the IHS. In the present disclosure, trusted boot firmware drivers are loaded during an early boot phase of the boot firmware, and untrusted boot firmware drivers are loaded during a late boot phase of the boot firmware or during OS runtime.

The at least one processing device may also be configured to execute a first set of program instructions within at least one trusted boot firmware driver to send a data-write request to the property service driver for writing non-volatile data to a protected namespace within the non-volatile memory. In addition, the at least one processing device may be configured to execute program instructions within the property service driver to receive the data-write request from the at least one trusted boot firmware driver, store the non-volatile data within the protected namespace, and prevent the untrusted boot firmware drivers from modifying or tampering with the non-volatile data written to the protected namespace by the at least one trusted boot firmware driver.

In some embodiments, the at least one processing device may execute program instructions within the at least one trusted boot firmware driver before sending the data-write request to the property service driver. For example, the at least one processing device may execute the first set of program instructions within the at least one trusted boot firmware driver when the at least one trusted boot firmware driver is loaded to: send a hash-based message authentication code (HMAC) key request to an embedded controller (EC) of the IHS to obtain an HMAC key from the EC, and store the HMAC key within a trusted memory region of volatile memory, which is only accessible by the trusted boot firmware drivers, if the HMAC key is received from the EC.

In some embodiments, the information handling system may further include an embedded controller (EC). In some embodiments, the EC may store the HMAC key within an encrypted memory region of the EC, and may provide the HMAC key to the at least one trusted boot firmware driver only if: (a) the HMAC key request is received by the EC before the end of the early boot phase, and (b) the HMAC key request is the first HMAC key request received by the EC during a current system boot.

In some embodiments, the data-write request sent to the property service driver may include the non-volatile data to be written to the protected namespace, a hash-based message authentication code (HMAC) of the non-volatile data and a namespace identifier, which identifies the protected namespace and a data owner of the non-volatile data. In some embodiments, the at least one trusted boot firmware driver may use an HMAC key, which was previously obtained by the at least one trusted boot firmware driver from an embedded controller (EC) of the IHS when the at least one trusted boot firmware driver is loaded, to generate the HMAC of the non-volatile data included within the data-write request.

Upon receiving the data-write request from the at least one trusted boot firmware driver, the program instructions within the property service driver may be further executed by the at least one processing device to: (a) contact the data owner to determine whether the data-write request received from the at least one trusted boot firmware driver was sent from the data owner; (b) reject the data-write request and discard the non-volatile data, if the data owner confirms that the data-write request was not sent from the data owner; and (c) store the non-volatile data and the HMAC of the non-volatile data within the protected namespace, if the data owner confirms that the data-write request was sent from the data owner.

In some embodiments, the at least one processing device may be further configured to execute a second set of program instructions within the at least one trusted boot firmware driver to verify the integrity of the non-volatile data stored within the protected namespace when the non-volatile data is read from the protected namespace. For example, the at least one processing device may be configured to execute the second set of program instructions within the at least one trusted boot firmware driver to send a data-read request to read the non-volatile data stored within the protected namespace of the non-volatile memory, and receive the non-volatile data read from the protected namespace along with a hash-based message authentication code (HMAC) of the non-volatile data, which was stored within the protected namespace along with the non-volatile data. Similar to the data-write request, the data-read request may include a namespace identifier that identifies the protected namespace containing the non-volatile data to be read.

After receiving the non-volatile data and the HMAC read from the protected namespace, the second set of program instructions within the at least one trusted boot firmware driver may be further executed by the at least one processing device to recalculate an HMAC of the non-volatile data read from the protected namespace, and compare the recalculated HMAC of the non-volatile data to the HMAC of the non-volatile data stored within the protected namespace. In some embodiments, the second set of program instructions may verify the integrity of the non-volatile data stored within the protected namespace, if the recalculated HMAC of the non-volatile data matches the HMAC of the non-volatile data stored within the protected namespace. In other embodiments, the second set of program instructions may detect tampering of the non-volatile data stored within the protected namespace, if the recalculated HMAC of the non-volatile data does not match the HMAC of the non-volatile data stored within the protected namespace. If tampering is detected, the at least one processing device may be configured in some embodiments to execute the second set of program instructions within the at least one trusted boot firmware driver to restore the non-volatile data originally stored within the protected namespace.

According to another embodiment, a computer-implemented method performed by at least one processing device of an information handling system (IHS) is provided herein to prevent unauthorized write operations to a non-volatile memory included within the IHS. The computer-implemented method disclosed herein may generally include: (a) receiving a data-write request from a boot firmware driver to write non-volatile data to a protected namespace within the non-volatile memory, wherein the data-write request includes the non-volatile data to be written to the protected namespace and a namespace identifier, which identifies the protected namespace and a data owner of the non-volatile data; (b) contacting the data owner to determine whether the data-write request received from the boot firmware driver was sent from the data owner; and (c) rejecting the data-write request and discarding the non-volatile data, if the data owner confirms that the data-write request received from the boot firmware driver was not sent from the data owner.

In some embodiments, the computer-implemented method may further include storing the non-volatile data to the protected namespace, if the data owner confirms that the data-write request received from the boot firmware driver was sent from the data owner.

In other embodiments, the computer-implemented method may further include storing the non-volatile data and a hash-based message authentication code (HMAC) of the non-volatile data to the protected namespace, if the data owner confirms that the data-write request received from the boot firmware driver was sent from the data owner.

In some embodiments, the computer-implemented method may include additional method steps prior to said receiving. For example, the computer-implemented method may further include executing boot firmware when the IHS is powered on or rebooted to initialize a system platform of the IHS, load boot firmware drivers and launch a bootloader to load an operating system (OS) for the IHS. As noted above, trusted boot firmware drivers may be loaded during an early boot phase of the boot firmware, and untrusted boot firmware drivers may be loaded during a late boot phase of the boot firmware or during OS runtime.

Prior to said receiving, the computer-implemented method may further include: sending a hash-based message authentication code (HMAC) key request from the boot firmware driver to an embedded controller (EC) of the IHS to obtain an HMAC key from the EC; receiving the HMAC key from the EC only if: (a) the HMAC key request is received by the EC before the end of the early boot phase, and (b) the HMAC key request is the first HMAC key request received by the EC during a current system boot; and storing the HMAC key within a trusted memory region of volatile memory, which is only accessible to the trusted boot firmware drivers, if the HMAC key is received from the EC. In some embodiments, the computer-implemented method may further include using the HMAC key stored within the trusted memory region of volatile memory to generate the HMAC of the non-volatile data.

According to yet another embodiment, a computer-implemented method performed by at least one processing device of an information handling system (IHS) is provided herein to verify the integrity of non-volatile data read from a non-volatile memory included within the IHS. The computer-implemented method disclosed herein may generally include: (a) sending a data-read request to read non-volatile data stored within a protected namespace of the non-volatile memory, wherein the data-read request includes a namespace identifier that identifies the protected namespace containing the non-volatile data to be read; (b) receiving the non-volatile data read from the protected namespace along with a hash-based message authentication code (HMAC) of the non-volatile data, which was stored within the protected namespace along with the non-volatile data; (c) recalculating an HMAC of the non-volatile data read from the protected namespace; (d) comparing the recalculated HMAC of the non-volatile data to the HMAC of the non-volatile data stored within the protected namespace; and (e) verifying the integrity of the non-volatile data read from the protected namespace, if the recalculated HMAC of the non-volatile data matches the HMAC of the non-volatile data stored within the protected namespace, or (f) detecting tampering of the non-volatile data read from the protected namespace, if the recalculated HMAC of the non-volatile data does not match the HMAC of the non-volatile data stored within the protected namespace. If tampering is detected in step (f), some embodiments of the computer-implemented method disclosed herein may further include restoring the non-volatile data originally stored within the protected namespace. In some embodiments, the computer-implemented method may further include using the non-volatile data read from the protected namespace only if the integrity of the non-volatile data is verified.

BRIEF DESCRIPTION OF THE DRAWINGS

Other advantages of the present disclosure will become apparent upon reading the following detailed description and upon reference to the accompanying drawings in which.

Figure 1:
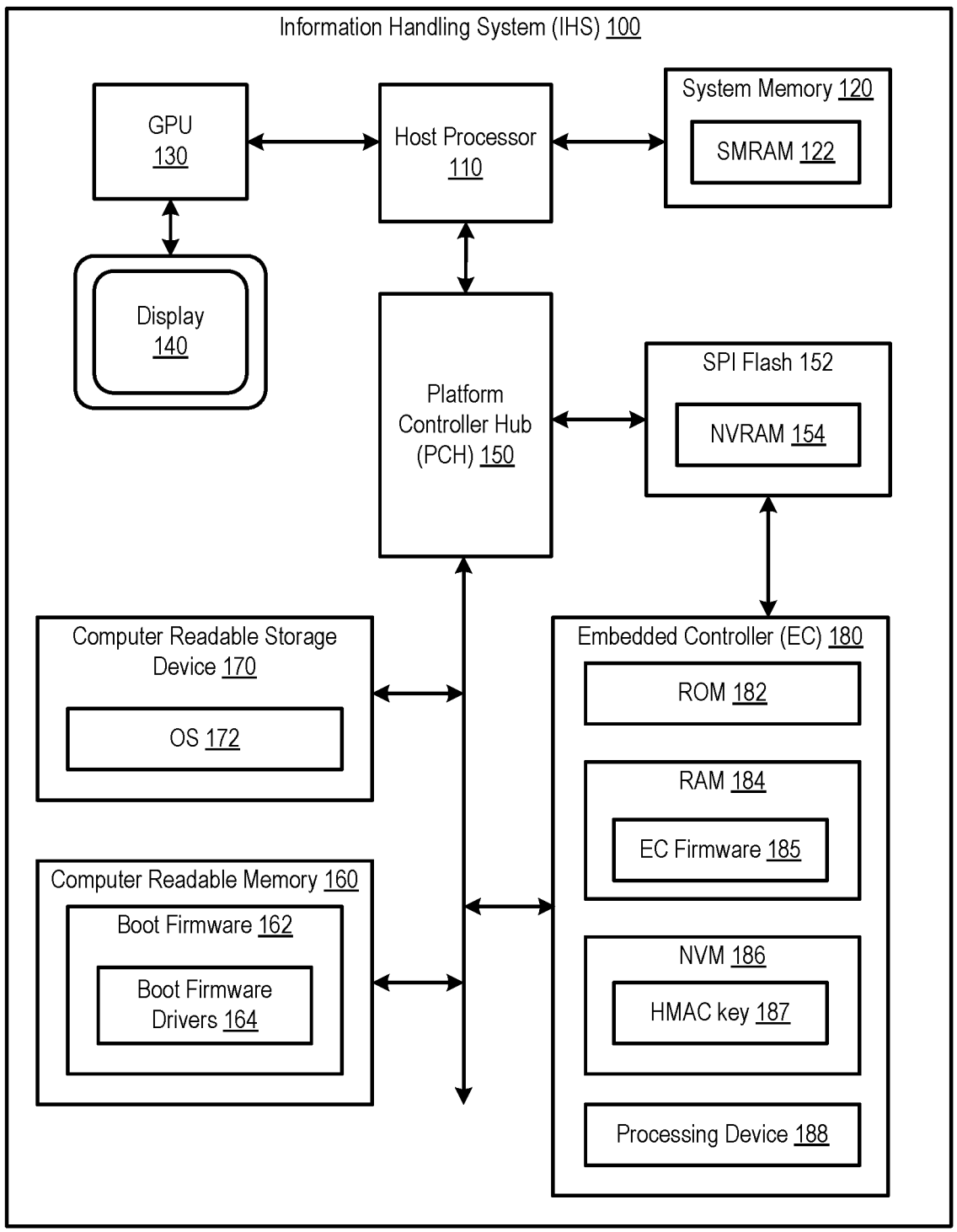
FIG. 1 is a block diagram illustrating one embodiment of an information handling system (IHS) that utilizes the techniques described herein to prevent tampering and verify the integrity of non-volatile data stored within non-volatile memory.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

The present disclosure provides various embodiments of information handling systems and related methods to prevent tampering and verify the integrity of non-volatile data stored within non-volatile memory. FIG. 1 is a block diagram of an information handling system 100 (e.g., a desktop computer, laptop computer, tablet computer, server, Internet of Things (IoT) device, etc.) as it may be configured according to one embodiment of the present disclosure. As shown in FIG. 1, IHS 100 may generally include a host processor 110, a system memory 120, a graphics processor unit (GPU) 130, a display device 140, and a platform controller hub (PCH) 150. In addition, IHS 100 may include a computer readable memory 160 for storing boot firmware 162 and boot firmware drivers 164, a computer readable storage device 170 for storing an operating system (OS) 172 and other software modules and data, and an embedded controller (EC) 180 for storing EC firmware 185 and a hash-based message authentication code (HMAC) key 187.

IHS 100 may also include various forms of non-volatile memory for storing non-volatile data. For example, IHS 100 may include non-volatile random access memory (NVRAM) 154, as shown in FIG. 1. As described in more detail below, techniques are disclosed herein to prevent tampering and verify the integrity of non-volatile data stored within NVRAM 154. Although described herein in the context of NVRAM 154, one skilled in the art would understand how the techniques described herein may be used to prevent tampering and verify the integrity of non-volatile data stored within other forms of non-volatile memory including, but not limited to, non-volatile rewritable memory.

It is expressly noted that the IHS configuration shown in FIG. 1 is exemplary only, and that the methods disclosed herein may be implemented on any type and/or configuration of information handling system having non-volatile memory for storing non-volatile data, a computer readable non-volatile memory for storing boot firmware and boot firmware drivers, and one or more processing devices (such as an embedded controller and/or host processor) for executing program instructions (or computer program code) to prevent tampering and verify the integrity of the non-volatile data stored within the non-volatile memory. It will be further understood that while certain components of the information handling system are shown in FIG. 1 for illustrating embodiments of the present disclosure, the information handling system disclosed herein is not restricted to including only those components shown in FIG. 1 and described below.

Host processor 110 may include various types of programmable integrated circuits (e.g., a processor, such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. The CPU may include any type of processing device, such as an Intel Pentium series processor, an Advanced Micro Devices (AMD) processor or another processing device.

System memory 120 is coupled to host processor 110 and generally configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS 100. In the illustrated embodiment, GPU 130 is coupled to display device 140 (e.g., a display screen or monitor) to provide visual images to the user. In some embodiments, GPU 130 may also be coupled to one or more display ports to support additional display functions. Although shown in FIG. 1 as a separate integrated chip coupled to host processor 110 via a bus, GPU 130 may alternatively be integrated with the host processor as a silicon-on-chip (SoC) processor.

Platform controller hub (PCH) 150 is coupled to host processor 110 and is generally configured to handle I/O operations for the IHS 100. As such, PCH 150 may include a variety of communication interfaces and ports for communicating with various IHS components, such as SPI Flash memory chip 152, NVRAM 154, computer readable memory 160, computer readable storage device 170 and EC 180. Examples of communication interfaces and ports that may be included within PCH 150 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

Computer readable storage device 170 may be any type of persistent, non-transitory computer readable storage device, such as one or more hard disk drives (HDDs) or solid-state drives (SSDs), and may be generally configured to store software and/or data. For example, computer readable storage device 170 may be configured to store an operating system (OS) 172, in addition to other software modules and data. OS 172 may contain program instructions (or computer program code), which may be executed by host processor 110 to perform various tasks and functions for the information handling system and/or for the user. More specifically, OS 172 may include operating system files, applications (including user interface applications), services, hardware drivers, etc., which may be executed by host processor 110 during OS runtime. Although not restricted to such, OS 172 may be one of the many Windows® operating systems provided by Microsoft.

Computer readable memory 160 may include any type of non-volatile (NV) memory including, but not limited to, read-only memory (ROM), Flash memory and non-volatile random-access memory (NVRAM), and may be generally configured to store software and/or firmware modules. The software and/or firmware modules stored within computer readable memory 160 may generally contain program instructions (or computer program code), which may be executed by one or more IHS processing devices to instruct components of IHS 100 to perform various tasks and functions for the information handling system.

As shown in FIG. 1, computer readable memory 160 may be generally configured to store boot firmware 162 and boot firmware drivers 164. Boot firmware 162 may be implemented as a Basic Input/Output System (BIOS) and/or a Unified Extensible Firmware Interface (UEFI). When the IHS 100 is powered on or rebooted, boot firmware 162 may be executed by one or more IHS processing devices (e.g., EC 180 and/or host processor 110) to boot the information handling system and perform other functions. As such, boot firmware 162 may include firmware modules for specifying hardware configuration settings, system date/time, boot sequence, etc. Boot firmware 162 may also include a wide variety of boot services (which are available for execution when the boot firmware 162 owns the system platform during a pre-boot phase before the OS 172 is loaded and running) and runtime services (which are available for execution during OS runtime).

Figure 2:
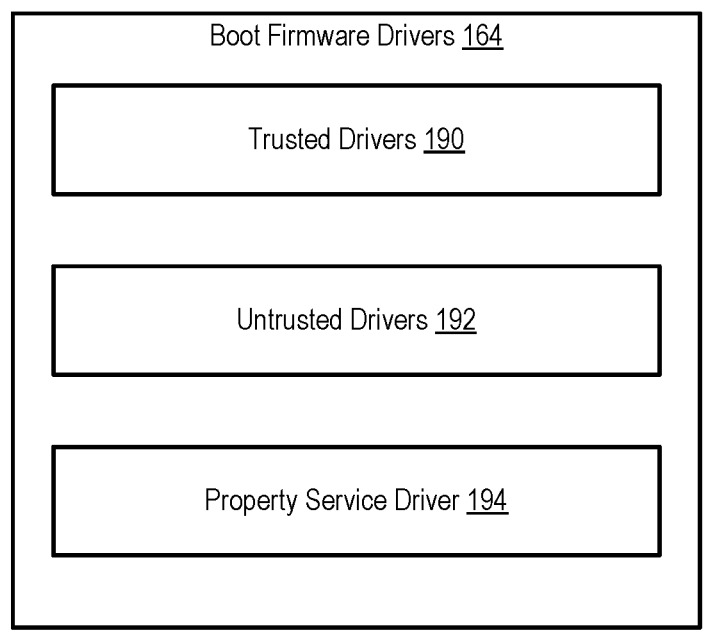
FIG. 2 is a block diagram illustrating various boot firmware drivers stored within the computer readable memory of the IHS shown in FIG. 1, the boot firmware drivers including trusted drivers, untrusted drivers and a property service driver.

Computer readable memory 160 may also store a wide variety of boot firmware drivers 164. As shown in FIG. 2, for example, boot firmware drivers 164 may store trusted drivers 190 and untrusted drivers 192. As described in more detail below, trusted drivers 190 are drivers that are loaded during the early boot phase, and thus, contain program instructions (or computer program code) that is trusted by the system platform. Untrusted drivers 192 are drivers that are loaded during a late boot phase, or during OS runtime, and thus, contain untrusted program code.

Property service driver 194 is a trusted boot firmware driver, which is stored within computer readable memory 160 and loaded during the early boot phase. As described in more detail below, property service driver 194 provides an interface that allows other boot firmware drivers to read from and/or write to non-volatile memory, such as NVRAM 154. In addition to facilitating read/write access, property service driver 194 prevents unauthorized drivers (such as untrusted drivers 192) from writing to NVRAM 154. In doing so, property service driver 194 prevents unauthorized drivers from storing their own non-volatile data within NVRAM 154, or tampering with the non-volatile data previously stored within NVRAM 154 by trusted drivers 190.

NVRAM 154 is one example of non-volatile rewritable memory that may be used to store non-volatile data. In some embodiments, NVRAM 154 may be included within a Serial Peripheral Interconnect (SPI) Flash memory chip 152, as shown in FIG. 1. In other embodiments (not shown), NVRAM 154 may be coupled directly to PCH 150. Although described in the context of NVRAM, other forms of non-volatile rewritable memory (e.g., Flash memory, erasable programmable read-only memory, "EPROM," electrically erasable programmable read-only memory, "EEPROM," etc.) may also be included within IHS 100 for storing non-volatile data. Although particularly useful for securing non-volatile rewritable memory, such as NVRAM 154, the embodiments disclosed herein may also be used to prevent tampering and verify the integrity of data stored within substantially any form of memory, including volatile memory, non-volatile memory and non-volatile rewritable memory.

In the embodiment shown in FIG. 1, EC 180 includes read only memory (ROM) 182 for storing a boot block, random access memory (RAM) 184 for storing EC firmware 185, and non-volatile memory (NVM) 186 for storing persistent data (such as, e.g., HMAC key 187). EC 180 also includes a processing device 188 (e.g., a controller, microcontroller, microprocessor, ASIC, etc.) for executing program instructions that are stored within its internal memory (e.g., ROM and RAM) and/or fetched from computer readable memory 160 and/or SPI Flash memory chip 152.

In some embodiments, EC 180 may be configured to boot the information handling system and perform other functions. For example, processing device 188 may execute program instructions (e.g., a boot block) stored within ROM 182 to initiate a boot process for the IHS 100. After the boot process is initialized, processing device 188 may execute program instructions (e.g., EC firmware 185) stored within RAM 184 to determine if an HMAC key 187 should be generated and/or provided to a boot firmware driver requesting access to the HMAC key, as described in more detail below in reference to FIGS. 4 and 5.

Upon system start-up or reboot, processing device 188 may initiate a boot process for the information handling system by executing the boot block stored within ROM 182 while PCH 150 and host processor 110 are in reset. As used herein, an IHS "boot process" is a process or set of operations performed by an information handling system component (e.g., EC 180 and/or host processor 110) to load and execute a boot system (e.g., BIOS and/or UEFI) and prepare the system for OS booting. When host processor 110 comes out of reset, the host processor retrieves the boot firmware 162 from computer readable memory 160, stores a local copy of the boot firmware within system memory 120, and executes the boot firmware to configure hardware components of the IHS, perform a Power-On Self-Test (POST) to ensure the hardware configuration is valid and working properly, discover and initialize devices, and launch a bootloader to load OS 172. Once launched, the bootloader within boot firmware 162 retrieves OS 172 from computer readable storage device 170 and loads it into system memory 120. Additional details regarding an exemplary boot process are shown in FIG. 3 and described in more detail below.

Figure 3:
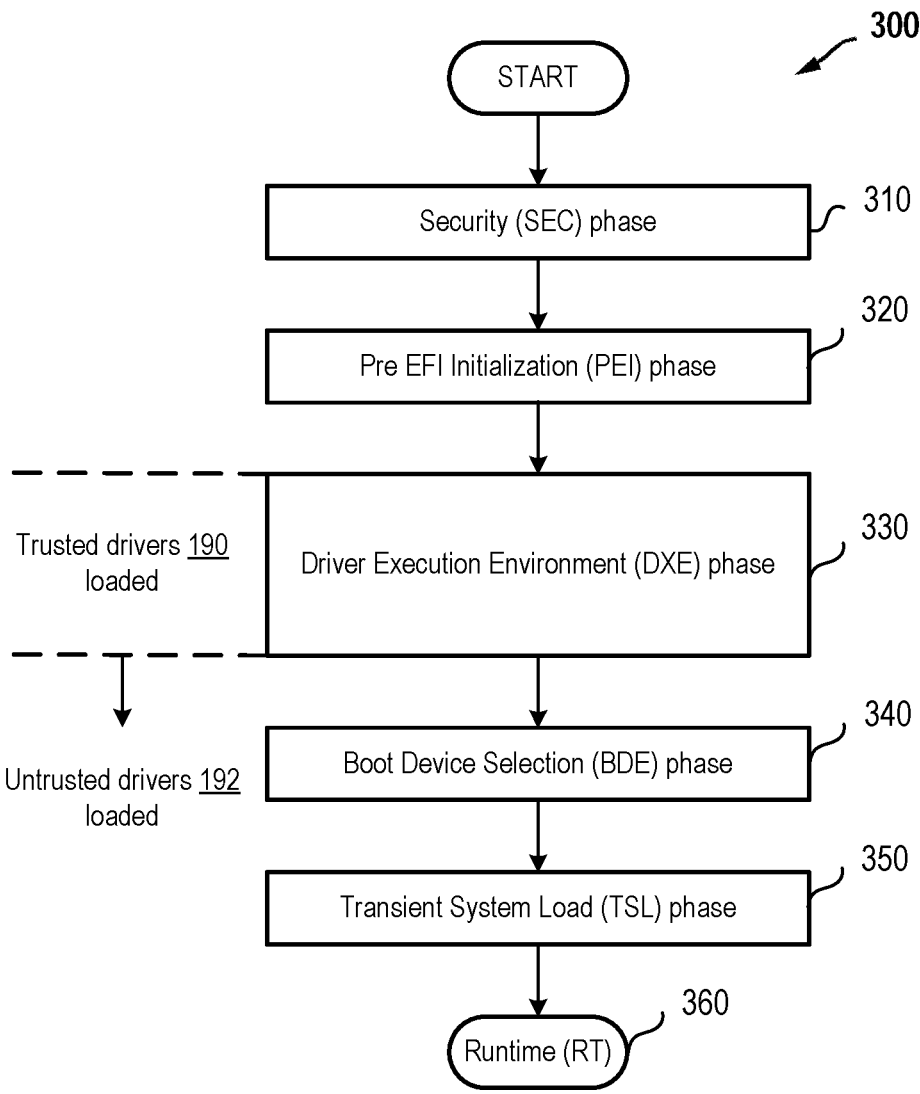
FIG. 3 (PRIOR ART) is a flowchart diagram illustrating the boot phases of a conventional UEFI boot process.

FIG. 3 illustrates a conventional UEFI boot process 300 that may be used to boot the information handling system. When an information handling system is powered up or rebooted, EC 180 may be used to execute pre-RAM code during the Security (SEC) phase 310 to initialize host processor 110, create a temporary memory store and provide a root of trust for the system. The EC root of trust ensures that any code executed during platform initialization is cryptographically validated, thereby creating a secure boot environment. Once the SEC phase 310 ends, the Pre-EFI Initialization (PEI) phase 320 occurs to complete initialization of host processor 110, allocate and initialize the system memory 120 and determine the boot mode (e.g., cold boot, S3, S4, etc.).

After the PEI phase 320, control passes to the Driver Execution Environment (DXE) phase 330, which is responsible for loading various drivers (e.g., device, bus and/or service drivers), runtime services and any boot services required for the operating system to start. Once the DXE phase 330 ends, control passes to the Boot Device Selection (BDS) phase 340, which may initialize any remaining devices before loading and executing a selected boot entry to launch a bootloader in the Transient System Load (TSL) phase 350. The bootloader is executed during the TSL phase 350 to load OS 172 and prepare the final OS environment before control of the system platform is passed to the OS during OS runtime 360.

As shown in FIG. 3, drivers loaded during the UEFI DXE phase 330 are usually considered to be trusted drivers 190 containing trusted program code. In other words, drivers loaded early in the boot phase (i.e., the trusted drivers 190) are trusted because they are protected by additional security assurances, such as trust chaining from the EC root of trust. Any drivers loaded after the DXE phase 330 ends (e.g., after the "End of DXE"), such as during BDS phase 340, TSL phase 350 or OS runtime 360, are not protected by additional security assurances, and thus, are considered to be untrusted drivers 192 containing untrusted program code.

The non-volatile data stored within NVRAM 154 is often critical to the information handling system boot process. For example, NVRAM 154 may be used to store BIOS configuration data, public key data used to authenticate manageability commands, and/or other persistent data blobs used to trace system or security state across boot cycles. In conventional information handling systems, however, the non-volatile data stored within NVRAM is not secured and can be compromised by malicious actors. For example, a malicious actor can utilize a runtime driver (e.g., an untrusted driver 192), or even a DXE driver (which is usually considered to be a trusted driver 190), to write their own non-volatile data to the NVRAM. The data provided by the malicious actor would be accepted, since conventional information handling systems do not provide a mechanism for preventing unauthorized write operations to NVRAM. This may cause a wide variety of problems within the information handling system (e.g., data corruption, security breaches, etc.), depending on the data provided by the malicious actor. In addition to failing to prevent unauthorized write operations to NVRAM, conventional information handling systems fail to provide a mechanism for verifying the integrity of the non-volatile data stored therein. Without such verification, conventional information handling systems cannot detect tampering of non-volatile data or provide a mechanism for restoring the data that has been tampered with.

To overcome the above-mentioned problems, the present disclosure provides various embodiments of improved information handling systems and related methods to prevent tampering and verify the integrity of non-volatile data stored within NVRAM (or another type of non-volatile memory). As described in more detail below, some of the embodiments disclosed herein may prevent tampering of non-volatile data by preventing unauthorized write operations to NVRAM. Other embodiments disclosed herein may verify the integrity of the non-volatile data stored within NVRAM when the non-volatile data is read.

Figure 4:
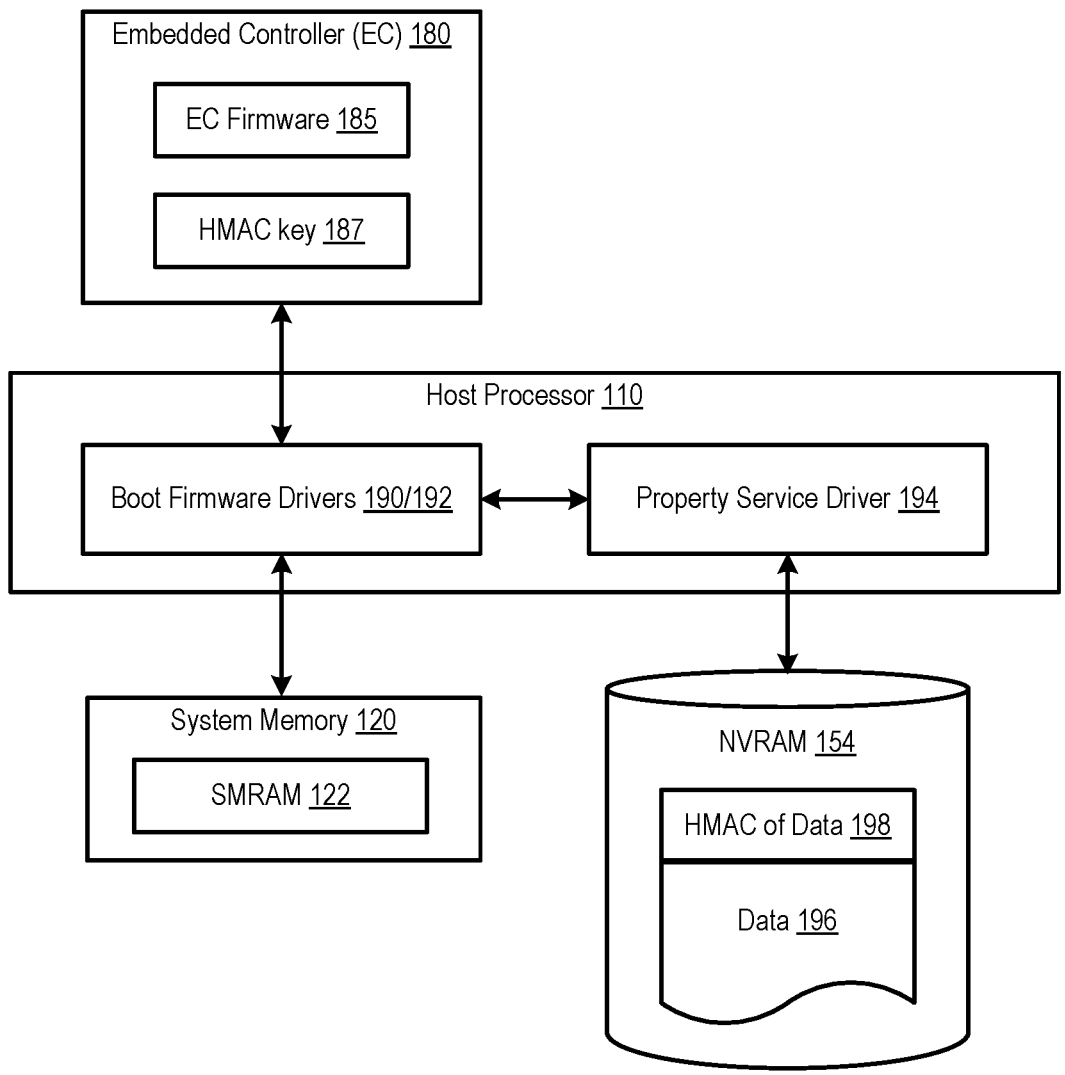
FIG. 4 is a block diagram illustrating example hardware and firmware components of the IHS shown in FIGS. 1 and 2 that may be used to perform the techniques described herein.

FIGS. 1, 2 and 4 illustrate one embodiment of an improved information handling system (IHS) 100 in accordance with the present disclosure. The IHS 100 shown in FIGS. 1, 2 and 4 improves upon conventional IHSs by providing mechanisms to prevent tampering and verify the integrity of non-volatile data stored within NVRAM 154 (or another non-volatile memory). More specifically, IHS 100 includes various hardware and firmware components that may be used to: (a) prevent tampering of non-volatile data stored within NVRAM 154 by preventing unauthorized write operations to the NVRAM, and either (b) verify the integrity of the non-volatile data read from the NVRAM, or (c) detect tampering, if the integrity of the non-volatile data cannot be verified. Examples of hardware and firmware components that may be used to perform the techniques described herein are illustrated in FIG. 4. It is noted that, while certain IHS components are illustrated in FIG. 4, IHS 100 may include additional and/or alternative hardware and/or firmware components to implement the techniques described herein.

In the embodiments disclosed herein, IHS 100 uses a hash-based message authentication code (HMAC) 198 to detect tampering of non-volatile data 196 written to NVRAM 154 by a data owner, or verify the integrity of non-volatile data 196 read from the NVRAM. All write operations to NVRAM 154 are accompanied by an HMAC 198 calculation of the non-volatile data 196 written to the NVRAM by the data owner. To prevent tampering, all write operations are confirmed with the data owner before writing the non-volatile data 196 and the HMAC 198 of the data to the NVRAM. During read operations, the HMAC of the non-volatile data 196 read from NVRAM 154 is recalculated and compared to the HMAC 198 stored within the NVRAM to either verify the integrity of the data 196 read from the NVRAM or detect tampering of the data 196 stored therein.

In the present disclosure, an HMAC key is used to calculate the HMAC of the non-volatile data 196 written to and read from NVRAM 154. In some embodiments, an HMAC key 187 may be generated by EC 180 at the first system boot (i.e., the first time the system platform is booted) and may be stored securely within the system platform. For example, processing device 188 of EC 180 may execute EC firmware 185 stored within RAM 184 to generate an HMAC key 187 at the first system boot. Once the HMAC key 187 is generated, EC 180 may store the HMAC key 187 within an encrypted memory region of NVM 186 of the EC until a data owner or another trusted driver 190 requests access to the HMAC key 187.

At each subsequent system boot, one or more boot firmware drivers 190/192 may send an HMAC key request to EC 180 when the driver(s) are loaded. EC 180 may provide the HMAC key 187 to the first trusted driver 190 (i.e., a boot firmware driver loaded during the DXE phase 330) that requests read access to the HMAC key. After the HMAC key 187 is read for the first time, EC 180 rejects all subsequent HMAC key requests until the next system boot. If EC 180 does not receive an HMAC key request before the end of the DXE phase 330, EC 180 locks the HMAC key data and rejects all read requests to access the HMAC key 187 until the next system boot.

Once the HMAC key 187 is received by the first trusted driver 190 requesting access to the key, the HMAC key 187 may be stored within a trusted memory region of the system memory 120 (or another volatile memory), which is only accessible to trusted drivers 190. In one example, the HMAC key 187 may be cached within System Management RAM (SMRAM) 122, as shown in FIGS. 1 and 4. This allows only trusted drivers 190 to retrieve and use the HMAC key 187 to calculate the HMAC of the non-volatile data 196 written to and read from NVRAM 154.

As noted above, property service driver 194 provides an interface, which allows other boot firmware drivers 190/192 to read from and/or write to NVRAM 154. In addition to facilitating read/write access, property service driver 194 prevents unauthorized drivers from writing to NVRAM 154 by ensuring that only data owners can write to protected namespaces within the NVRAM. As used herein, unauthorized drivers include both untrusted drivers 192 and trusted drivers 190 that do not "own" the data and/or the protected namespace where the data is written.

In the present disclosure, a "data owner" is a trusted driver 190 (i.e., a driver loaded during the early boot phase of the boot firmware) that owns the data and/or the protected namespace where the data is written. In order to write non-volatile data 196 to a protected namespace, a data owner may send a data-write request to property service driver 194 containing the non-volatile data 196 to be written to NVRAM 154, an HMAC 198 calculation of the non-volatile data 196 and a namespace identifier, which identifies the protected namespace and the data owner. Upon receiving the data-write request, property service driver 194 may confirm that the data-write was requested by the data owner before writing the non-volatile data 196 and the HMAC 198 of the data to the protected namespace identified by the namespace identifier. By requiring confirmation of "ownership," the property service driver 194 prevents unauthorized write operations to NVRAM 154, and as a result, prevents tampering and/or modification of the non-volatile data stored therein.

A data owner (or another driver) may also send a data-read request to the property service driver 194 to read non-volatile data 196 stored within NVRAM 154. Upon receiving a data-read request, property service driver 194 may return the non-volatile data 196 and the HMAC 198 of the data stored within NVRAM 154 to the data owner without confirming "ownership." Once the requested data 196 and HMAC 198 are received, the data owner may recalculate the HMAC of the data 196 read from NVRAM 154 and compare the recalculated HMAC to the stored HMAC 198. The data owner may verify the integrity of the non-volatile data 196 read from NVRAM 154, if the recalculated HMAC matches the stored HMAC 198. Otherwise, the data owner may detect tampering of the non-volatile data 196 within NRAM 154 and may take action(s) to restore the non-volatile data 196 originally stored therein.

Figure 5:
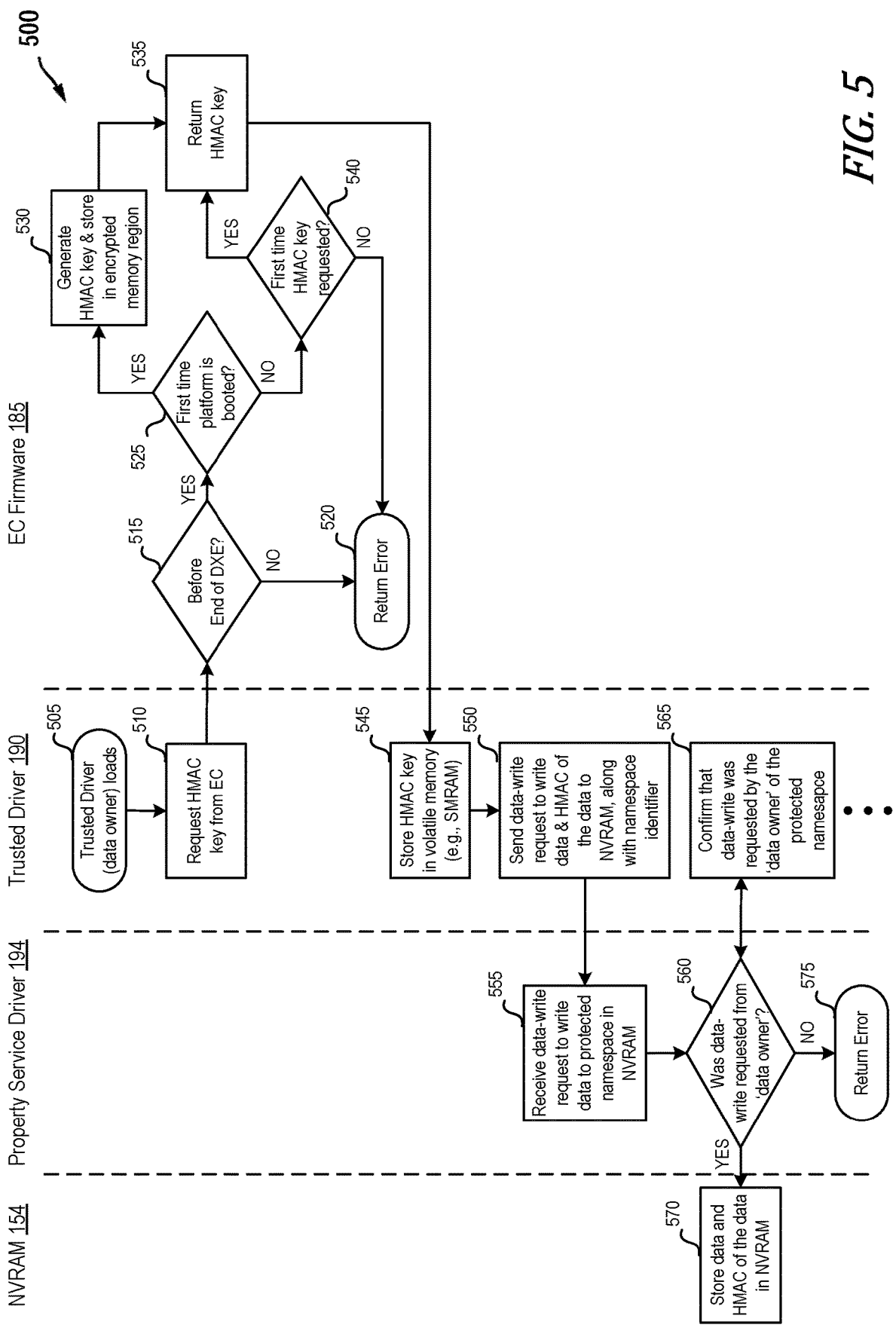
FIG. 5 is a flowchart diagram illustrating one embodiment of a method performed by various hardware and firmware components of the IHS shown in FIGS. 1, 2 and 4 to allow only trusted drivers (such as, e.g., a data owner) to write non-volatile data to non-volatile memory.
Figure 6:
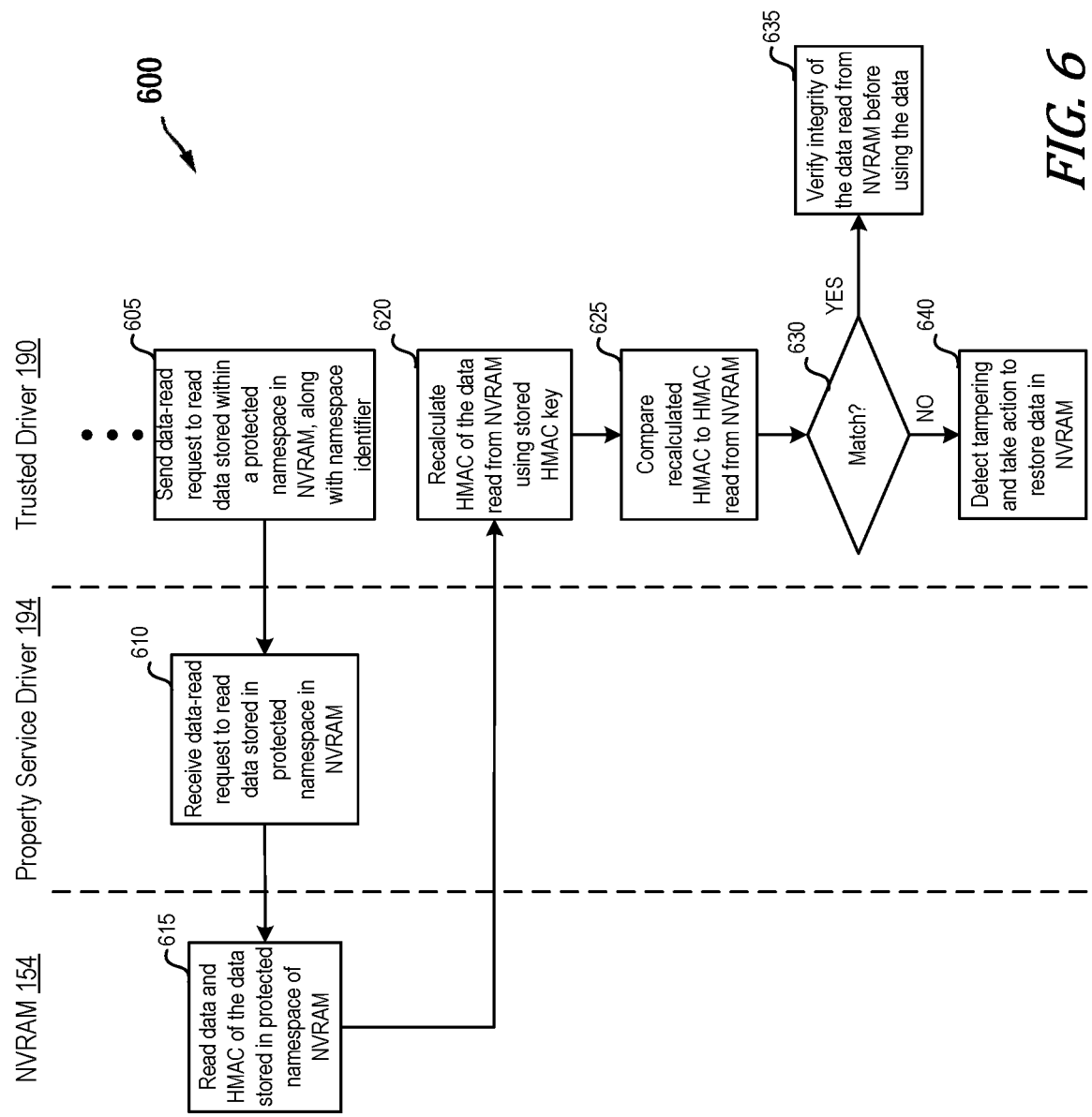
FIG. 6 is a flowchart diagram illustrating one embodiment of a method performed by various hardware and firmware components of the IHS shown in FIGS. 1, 2 and 4 to enable a trusted driver (e.g., the data owner or another trusted driver) to verify the integrity of non-volatile data read from non-volatile memory.
Figure 7:
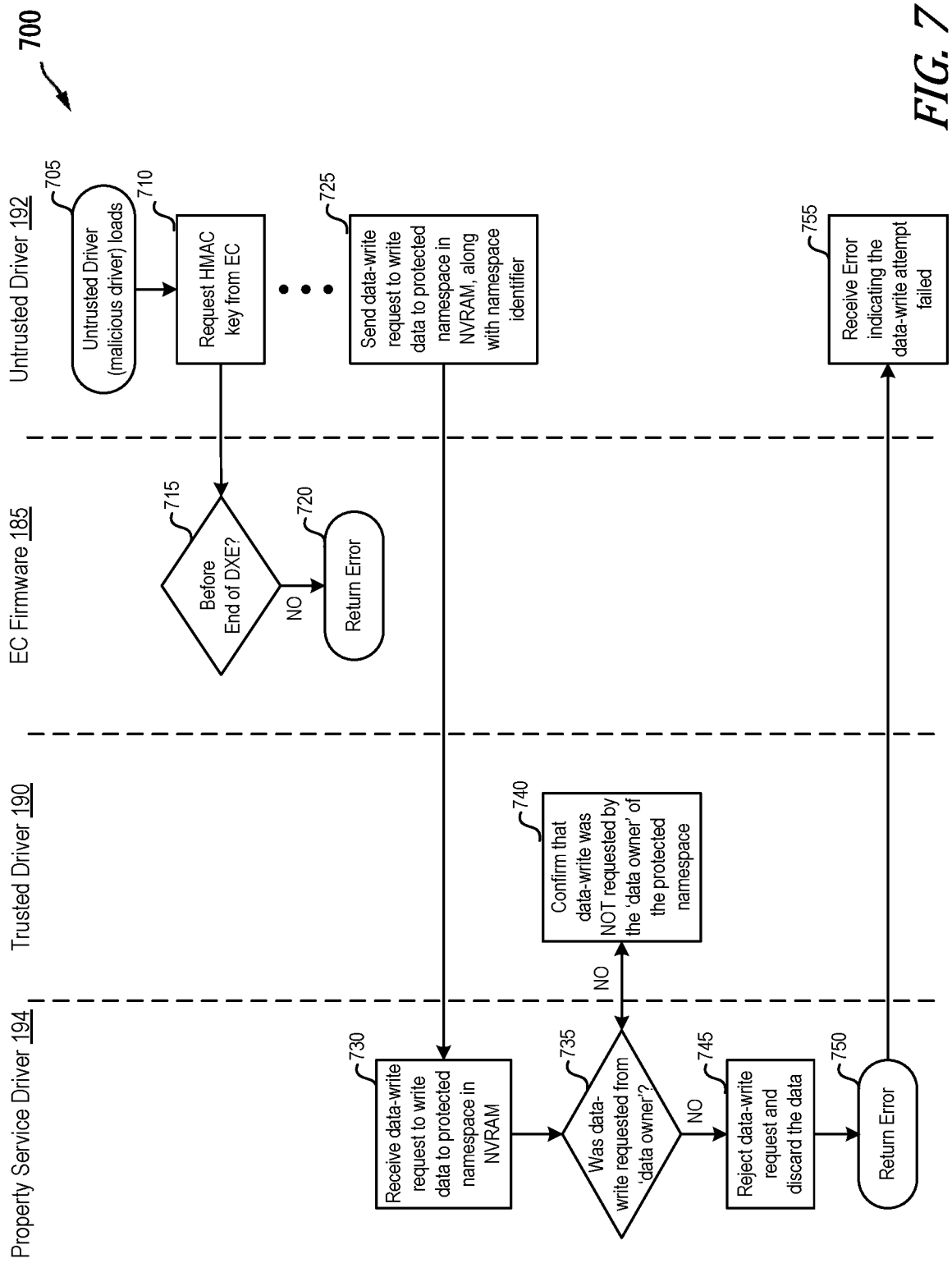
FIG. 7 is a flowchart diagram illustrating one embodiment of a method performed by various hardware and firmware components of the IHS shown in FIGS. 1, 2 and 4 to prevent untrusted drivers from writing to the non-volatile memory.

FIGS. 5-7 illustrate various embodiments of methods in accordance with the present disclosure. For example, FIG. 5 illustrates one embodiment of a method 500 performed by various hardware and firmware components of the IHS 100 shown in FIGS. 1, 2 and 4 to allow only trusted drivers (such as, e.g., a data owner) to write non-volatile data to NVRAM 154 (or another non-volatile memory). FIG. 6 illustrates one embodiment of a method 600 performed by various hardware and firmware components of the IHS 100 shown in FIGS. 1, 2 and 4 to enable a trusted driver (e.g., the data owner or another trusted driver) to verify the integrity of non-volatile data read from NVRAM 154 (or another non-volatile memory). FIG. 7 illustrates one embodiment of a method 700 performed by various hardware and firmware components of the IHS 100 shown in FIGS. 1, 2 and 4 to prevent untrusted drivers from: (a) accessing the HMAC key stored within the EC 180, and (b) writing to protected namespaces within NVRAM 154 (or another non-volatile memory).

The methods shown in FIGS. 5-7 are computer implemented methods performed, at least in part, by one or more processing devices of an information handling system. According to one example implementation, EC 180 and host processor 110 of IHS 100 may perform the method steps shown in FIGS. 5-7 by executing program instructions stored within RAM 184 (such as, e.g., program instructions contained within EC firmware 185) and computer readable memory 160 (such as, e.g., program instructions contained within trusted drivers 190, untrusted drivers 192 and property service driver 194). Unlike conventional information handling systems, the computer implemented methods shown in FIGS. 5-7 improve the way in which an information handling system functions, in at least some respects, by: (a) preventing tampering of non-volatile data stored within NVRAM 154 (or another non-volatile memory) by preventing unauthorized write operations to the NVRAM, and either (b) verifying the integrity of the non-volatile data read from the NVRAM, or (c) detecting tampering, if the integrity of the non-volatile data cannot be verified.

FIG. 5 illustrates one embodiment of a method 500 that allows only trusted drivers (such as, e.g., a data owner) to write non-volatile data to NVRAM 154 (or another non-volatile memory). When an information handling system is powered on or rebooted, boot firmware may be executed by one or more processing devices of the IHS to initialize the system platform, load boot firmware drivers and launch a bootloader to load an operating system for the IHS. The method 500 shown in FIG. 5 may generally begin when a trusted driver 190 is loaded during an early boot phase of the boot firmware (in step 505), such as during the DXE phase 330 of the UEFI boot process 300 shown in FIG. 3.

When the trusted driver 190 is loaded (in step 505), the trusted driver may request an HMAC key from EC 180 (in step 510) by sending an HMAC key request to the EC. Upon receiving an HMAC key request, EC 180 executes EC firmware 185 to determine if the HMAC key request was received by a trusted driver 190 or an untrusted driver 192 before generating and/or returning the HMAC key to the driver requesting access to the key. As shown in FIG. 5, for example, EC 180 may execute EC firmware 185 to determine if the HMAC key request was received before the end of the DXE phase (in step 515), since only trusted drivers are loaded during the DXE phase.

If the HMAC key request is received before the end of the DXE phase (YES branch of step 515), EC 180 executes EC firmware 185 to determine if the current system boot is the first system boot (i.e., the time the system platform has been booted) (in step 525). If EC 180 determines that the current system boot is the first system boot (YES branch of step 525), EC 180 executes EC firmware 185 to generate an HMAC key and store the generated HMAC key within an encrypted memory region of the EC (in step 530) before returning the HMAC key to the trusted driver requesting access to the key (in step 535).

If EC 180 determines that the current system boot is not the first system boot (NO branch of step 525), EC 180 executes EC firmware 185 to determine if the HMAC key request is the first HMAC key request received during the current system boot (in step 540). If EC 180 determines this is the first time the HMAC key has been requested (YES branch of step 540), EC 180 returns the HMAC key to the trusted driver 190 requesting access to the key (in step 535). Upon receiving the HMAC key, trusted driver 190 stores the HMAC key within volatile memory (in step 545). In some embodiments, the trusted driver 190 may store HMAC key within a trusted memory region of the system memory 120 (e.g., SMRAM 122), which is only accessible to trusted drivers 190. In doing so, the trusted driver 190 ensures that only trusted drivers loaded during the early boot phase will be able to retrieve and use the HMAC key.

In some embodiments, EC 180 may return an error (in step 520) and the method 500 may end, if EC 180 determines that: (a) the HMAC key request was received after the DXE phase ended (NO branch of step 515), or (b) the HMAC key request was not the first HMAC key request received during the current system boot (NO branch of step 540). In doing so, EC 180 prevents untrusted drivers 192, which are loaded after the DXE phase ends, from gaining access to the HMAC key.

Sometime after the HMAC key is stored within volatile memory (in step 545), the trusted driver 190 may send a data-write request to the property service driver 194 to write non-volatile data to a protected namespace within NVRAM 154 (in step 550). The data-write request sent in step 550 may include the non-volatile data to be written to NVRAM 154, an HMAC of the non-volatile data and a namespace identifier, which identifies the protected namespace and the data owner. The trusted driver 190 may use the HMAC key stored in volatile memory in step 545 to generate the HMAC of the non-volatile data prior to sending the data-write request in step 550.

Property service driver 194 receives the data-write request to write non-volatile data to the protected namespace identified by the namespace identifier (in step 555) and determines if the data-write was requested by the data owner of the protected namespace (in step 560). To confirm "ownership," property service driver 194 contacts the data owner identified by the namespace identifier, which was sent with the data-write request in step 550. Property service driver 194 may store the non-volatile data and the HMAC of the data within the protected namespace of NVRAM 154 (in step 570), if the data owner of the protected namespace confirms that they sent the data-write request (in step 565). If confirmation is not received from the data owner, property service driver 194 returns an error (in step 575) and the method 500 ends.

FIG. 6 illustrates one embodiment of a method 600 that enables a trusted driver (e.g., the data owner or another trusted driver) to verify the integrity of non-volatile data read from NVRAM 154 (or another non-volatile memory). The method 600 shown in FIG. 6 may be performed late in the boot process (e.g., after the end of DXE) and/or during OS runtime to verify the integrity of non-volatile data read from NVRAM 154. As shown in FIG. 6, method 600 may begin when a trusted driver 190 sends a data-read request to the property service driver 194 to read data stored within a protected namespace in NVRAM 154 (in step 605). Like the data-write request sent in step 550 of FIG. 5, the data-read request sent in step 605 of FIG. 6 may include a namespace identifier, which identifies the protected namespace containing the data to be read.

Upon receiving the data-read request (in step 610), property service driver 194 reads the non-volatile data and the HMAC of the non-volatile data stored within the protected namespace of NVRAM 154 (in step 615) and returns the non-volatile data and the stored HMAC to the trusted driver 190 requesting the data. Once the requested data and HMAC are received, the trusted driver 190 recalculates the HMAC of the data read from NVRAM 154 using the HMAC key stored in volatile memory (in step 620) and compares the recalculated HMAC to the HMAC read from the NVRAM (in step 625). The trusted driver 190 may verify the integrity of the non-volatile data read from NVRAM 154 (in step 635), if the recalculated HMAC matches the HMAC read from the NVRAM (YES branch of step 630). The non-volatile data read from NVRAM 154 is used only if the integrity of the non-volatile data is verified in step 635. By verifying the integrity of the non-volatile data read from NVRAM 154 before it is used, the method 600 shown in FIG. 6 prevents corrupted data (i.e., non-volatile data that has been modified by an untrusted boot firmware driver or malicious actor) from being utilized within the IHS.

If the recalculated HMAC does not match the HMAC read from NVRAM 154 (NO branch of step 630), the trusted driver 190 may detect tampering of the non-volatile data read from NRAM 154 and may take action(s) to restore the non-volatile data originally stored therein (in step 640). For example, if tampering is detected, the trusted driver 190 may fetch a copy of the non-volatile data from a trusted location and may use the copy of the non-volatile data to replace or restore the non-volatile data originally stored within the protected namespace of NVRAM 154.

FIG. 7 illustrates one embodiment of a method 700 that prevents untrusted drivers from: (a) accessing the HMAC key stored within the EC 180, and (b) writing to protected namespaces within NVRAM 154 (or another non-volatile memory). The method 700 shown in FIG. 7 may generally be performed during a late boot phase (e.g., after the end of DXE) and/or during OS runtime to prevent unauthorized write operations from untrusted drivers 192. As shown in FIG. 7, method 700 may begin when an untrusted driver 192 (e.g., a malicious driver) is loaded (in step 705) after the DXE phase ends. When an untrusted driver 192 is loaded (in step 705), the untrusted driver may request an HMAC key from the EC 180 (in step 710) by sending an HMAC key request to the EC. Similar to the embodiment shown in FIG. 5, EC 180 may execute EC firmware 185 upon receiving an HMAC key request to determine if the HMAC key request was received before the end of the DXE phase (in step 715). Since untrusted drivers are loaded after the end of DXE (NO branch of step 715), EC 180 returns an error to the untrusted driver 192 (in step 720). This prevents untrusted drivers 192 from gaining access to the HMAC key, which is used in the present disclosure to verify the integrity of non-volatile data stored within NVRAM 154.

In some cases, an untrusted driver 192 may attempt to tamper with non-volatile data stored within NVRAM 154. For example, the untrusted driver 192 may send a data-write request to property service driver 194 to write their own non-volatile data to a protected namespace within NVRAM 154 (in step 725). The data-write request sent from the untrusted driver 192 may include the non-volatile data to be written to NVRAM 154 and a namespace identifier, which identifies the protected namespace and the data owner. Property service driver 194 receives the data-write request to write non-volatile data to the protected namespace identified by the namespace identifier (in step 730) and determines if the data-write was requested by the data owner of the protected namespace (in step 735). To confirm "ownership," the property service driver 194 contacts the data owner identified by the namespace identifier sent with the data-write request. In the embodiment shown in FIG. 7, the data owner informs the property service driver 194 that the data-write was not requested by the data owner of the protected namespace (in step 740). Since "ownership" is not confirmed, the property service driver 194 rejects the data-write request and discards the non-volatile data (in step 745) and returns an error (in step 750). In step 755, the untrusted driver 192 receives the error indicating that the data-write attempt failed and the method 700 ends.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. An information handling system (IHS), comprising:
   a first non-volatile memory storing boot system configuration data;
   a second non-volatile memory providing a computer readable memory storing boot firmware and a plurality of boot firmware drivers, wherein the plurality of boot firmware drivers include a first trusted boot firmware driver, multiple additional trusted boot firmware drivers that are separate and different from the first trusted boot firmware driver, and multiple untrusted boot firmware drivers;
   at least one processing device configured to:
      execute program instructions within the boot firmware when the IHS is powered on or rebooted to initiate a boot process of the IHS to initialize a system platform of the IHS, load the plurality of boot firmware drivers and launch a bootloader to load an operating system (OS) for the IHS, wherein each of the first and additional trusted boot firmware drivers are loaded during an early boot phase of the boot firmware to read from and/or write to the first non-volatile memory, wherein the untrusted boot firmware drivers are loaded during a late boot phase of the boot firmware or during OS runtime, and wherein the first trusted boot firmware driver provides an interface between the first non-volatile memory and each of the multiple additional trusted boot firmware drivers and the multiple untrusted boot firmware drivers;
      execute a first set of program instructions within each given one of the additional trusted boot firmware drivers to send a data-write request to the first trusted boot firmware driver requesting a write of non-volatile data to a protected namespace within the first non-volatile memory; and
      execute program instructions within the first trusted boot firmware driver to receive the data-write request from the given additional trusted boot firmware driver, store the non-volatile data within the protected namespace of the first non-volatile memory, and verify the data-write request by confirming that the data-write was actually requested by the given additional trusted boot firmware driver before writing the non-volatile data to the protected namespace within the first non-volatile memory to prevent the untrusted boot firmware drivers and unauthorized additional trusted boot firmware drivers from modifying or tampering with the non-volatile data written to the protected namespace of the first non-volatile memory of the given additional trusted boot firmware driver;
      where for each given requested write operation of respective corresponding non-volatile data to the first non-volatile memory made by any of the plurality of additional trusted boot firmware drivers and untrusted boot firmware drivers, the at least one processing device is configured to:
         contact a given respective additional trusted boot firmware driver that has been identified to the first trusted boot firmware driver as requesting the given requested write operation to request that the given respective additional trusted boot firmware driver confirm that the given respective additional trusted boot firmware driver actually requested the given requested write operation and sent the data-write request, and
         require that the given respective additional trusted boot firmware driver respond to the request by confirming that it actually requested the given requested write operation before writing the respective corresponding non-volatile data to the first non-volatile memory.

2. The information handling system as recited in claim 1, further comprising a host processing device, a volatile memory, and an embedded controller (EC); where the EC itself comprises an EC processing device and a third non-volatile memory that provides an EC non-volatile memory; where the EC processing device is programmed to initiate the boot process; and wherein before the data-write request is sent to the first trusted boot firmware driver, the host processing device executes the first set of program instructions within each given one of the additional trusted boot firmware drivers when the given additional trusted boot firmware driver is loaded to:
   send a hash-based message authentication code (HMAC) key request to the embedded controller (EC) of the IHS to obtain an HMAC key from the EC; and
   store the HMAC key within a trusted memory region of the volatile memory, which is only accessible by the additional trusted boot firmware drivers, if the HMAC key is received from the EC.

3. The information handling system as recited in claim 2, where the boot firmware is executed as the boot process at least in part by the host processing device; wherein the EC stores the HMAC key within an encrypted memory region of the third non-volatile memory of the EC, and wherein the EC provides the HMAC key to the second trusted boot firmware driver only if: (a) the HMAC key request is received by the EC from the host processing device before the end of the early boot phase of the boot firmware, and (b) the HMAC key request is the first HMAC key request received by the EC during the boot process for a current system boot.

4. The information handling system as recited in claim 1, further comprising a host processing device and an embedded controller (EC); wherein the data-write request includes the non-volatile data that is requested to be written to the protected namespace of the first non-volatile memory, a hash-based message authentication code (HMAC) of the non-volatile data that is requested to be written to the protected namespace of the first non-volatile memory and a namespace identifier, which identifies the protected namespace and a respective one of the additional trusted boot firmware drivers that has been previously designated as a data owner of both the non-volatile data that is requested to be written to the first non-volatile memory and the protected namespace of the first non-volatile memory, the respective additional trusted boot firmware driver being loaded by the host processing device during the early boot phase of the boot firmware.

5. The information handling system as recited in claim 4, wherein each given one of the multiple additional trusted boot firmware drivers uses an HMAC key, which was previously obtained by the given additional trusted boot firmware driver from an embedded controller (EC) of the IHS when the given additional second trusted boot firmware driver is loaded, to generate the HMAC of the non-volatile data.

6. The information handling system as recited in claim 4, wherein upon receiving the data-write request from the given additional trusted boot firmware driver, the program instructions within the first trusted boot firmware driver are executed by the at least one processing device to:
   reject the data-write request and discard the non-volatile data, if the additional trusted boot firmware driver previously designated as the data owner confirms that the data-write request was not sent from the additional trusted boot firmware driver previously designated as the data owner; and
   store the non-volatile data and the HMAC of the non-volatile data within the protected namespace, if the additional trusted boot firmware driver previously designated as the data owner confirms that the data-write request was sent from the additional trusted boot firmware driver previously designated as the data owner.

7. The information handling system as recited in claim 1, wherein the at least one processing device is further configured to execute a second set of program instructions within each given one of the additional trusted boot firmware drivers to verify the integrity of the non-volatile data stored within the protected namespace of the first non-volatile memory when the non-volatile data is read from the protected namespace of the first non-volatile memory.

8. The information handling system as recited in claim 7, wherein the at least one processing device is configured to execute the second set of program instructions within each given one of the additional trusted boot firmware drivers to:
   send a data-read request to the first trusted boot firmware driver to read the non-volatile data stored within the protected namespace of the first non-volatile memory, wherein the data-read request includes a namespace identifier that identifies the protected namespace containing the non-volatile data to be read;
   receive from the first trusted boot firmware driver the non-volatile data read from the protected namespace of the first non-volatile memory along with a hash-based message authentication code (HMAC) of the non-volatile data, which was stored within the protected namespace of the first non-volatile memory along with the non-volatile data;
   recalculate an HMAC of the non-volatile data read from the protected namespace;
   compare the recalculated HMAC of the non-volatile data to the HMAC of the non-volatile data stored within the protected namespace of the first non-volatile memory; and
   verify the integrity of the non-volatile data stored within the protected namespace of the first non-volatile memory, if the recalculated HMAC of the non-volatile data matches the HMAC of the non-volatile data stored within the protected namespace of the first non-volatile memory.

9. The information handling system as recited in claim 8, wherein the at least one processing device is configured to execute the second set of program instructions within each given one of the additional trusted boot firmware drivers to detect tampering of the non-volatile data stored within the protected namespace of the first non-volatile memory, if the recalculated HMAC of the non-volatile data does not match the HMAC of the non-volatile data stored within the protected namespace of the first non-volatile memory.

10. The information handling system as recited in claim 9, wherein if tampering is detected, the at least one processing device is configured to execute the second set of program instructions within each given one of the additional trusted boot firmware drivers to restore the non-volatile data originally stored within the protected namespace of the first non-volatile memory by fetching a copy of the non-volatile data from a separate trusted location that corresponds to the protected namespace containing the non-volatile data to be read; and using the fetched copy of the non-volatile data to replace or restore the non-volatile data previously stored within the protected namespace of the first non-volatile memory.

11. A computer-implemented method performed by at least one processing device of an information handling system (IHS) to prevent unauthorized write operations to a first non-volatile memory included within the IHS, the computer-implemented method comprising:
   executing boot firmware when the IHS is powered on or rebooted to initiate a boot process of the IHS to initialize a system platform of the IHS, load trusted boot firmware drivers during an early boot phase of the boot firmware that includes multiple trusted boot firmware drivers that are each loaded during the early boot phase of the firmware and that are each designated as a respective data owner of respective corresponding non-volatile data on the first non-volatile memory and that are each designated a data owner of a respective corresponding protected namespace within the first non-volatile memory, to load multiple untrusted boot firmware drivers during a late boot phase of the boot firmware or during OS runtime, and to launch a bootloader to load an operating system (OS) for the IHS;
   receiving a data-write request from a given one of the untrusted or trusted boot firmware drivers stored on a second non-volatile memory to write first non-volatile data to a first protected namespace within the first non-volatile memory that is designated as being owned by a first one of the trusted boot firmware drivers, the data-write request including the first non-volatile data to be written to the first protected namespace and a namespace identifier, which identifies the first protected namespace and that identifies the first one of the trusted boot firmware drivers that is the data owner of the first non-volatile data;
   identifying and contacting the first trusted boot firmware driver that is the data owner of the first protected namespace and the first non-volatile data to request that the first trusted boot firmware driver respond by indicating whether the data-write request previously received from the given trusted boot firmware driver was actually sent from the first trusted boot firmware driver that is the data owner of the first protected namespace and the first non-volatile data; and
   rejecting the data-write request and discarding the non-volatile data received from the given one of the untrusted or trusted boot firmware drivers, if the first trusted boot firmware driver responds that the data-write request received from the given boot firmware driver was not actually sent from the first trusted boot firmware driver; and
   using a designated one of the multiple trusted boot firmware drivers to provide an interface for communications between the first non-volatile memory and each of the multiple trusted boot firmware drivers and the multiple untrusted boot firmware drivers, the designated one of the multiple trusted boot firmware drivers being separate and different from the given one of the untrusted or trusted boot firmware drivers from which the data-write request is received.

12. The computer-implemented method as recited in claim 11, further comprising storing the non-volatile data to the protected namespace, if the first trusted boot firmware driver confirms that the data-write request received from the boot firmware driver was sent from the data owner.

13. The computer-implemented method as recited in claim 11, further comprising storing the non-volatile data and a hash-based message authentication code (HMAC) of the non-volatile data to the protected namespace, if the first trusted boot firmware driver data confirms that the data-write request received from the boot firmware driver was sent from the data owner.

14. The computer-implemented method as recited in claim 13, wherein prior to said receiving, the computer-implemented method further comprises:
   using a host processing device of the IHS to send a hash-based message authentication code (HMAC) key request from each of the multiple trusted boot firmware drivers to an embedded controller (EC) of the IHS to obtain an HMAC key from the EC;
   receiving the HMAC key in a given one of the multiple trusted boot firmware drivers from the EC only if: (a) the HMAC key request is received by the EC before the end of the early boot phase, and (b) the HMAC key request provided from the first trusted boot firmware driver is the first HMAC key request received by the EC from any of the multiple trusted boot firmware drivers during a current system boot;
   using a processing device of the EC to perform the following:
      if no HMAC key request is received by the EC before the end of the early boot phase, then locking data of the HMAC key and rejecting all read requests to access the HMAC key until the next following system boot, and
      after the HMAC key is read for the first time, then reject all subsequent HMAC requests received by the EC until the next system boot; and
   storing the HMAC key within a trusted memory region of volatile memory, which is only accessible to the multiple trusted boot firmware drivers, if the HMAC key is received from the EC.

15. The computer-implemented method as recited in claim 14, further comprising using the HMAC key stored within the trusted memory region of volatile memory to generate the HMAC of the non-volatile data.

16. A computer-implemented method performed by at least one processing device of an information handling system (IHS) to verify the integrity of non-volatile data read from a first non-volatile memory included within the IHS, the computer-implemented method comprising:
   loading, during an early boot phase of boot firmware stored on a second non-volatile memory, multiple trusted boot firmware drivers that are each designated as a respective data owner of respective corresponding non-volatile data on the first non-volatile memory and that are each a designated data owner of respective corresponding non-volatile data on the first non-volatile memory and that are each a designated data owner of a respective corresponding protected namespace within the first non-volatile memory;
   using a designated one of the multiple trusted boot firmware drivers to provide an interface for communications between the first non-volatile memory and each of the multiple trusted boot firmware drivers;
   sending, via the interface of the designated one of the multiple trusted boot firmware drivers, a data-read request from a given one of the trusted boot firmware drivers that is a designated data owner of respective corresponding non-volatile data on the first non-volatile memory to read the respective corresponding non-volatile data owned by the given trusted boot firmware driver that is stored within the respective corresponding protected namespace of the first non-volatile memory that is owned by the given trusted boot firmware driver, the data-read request including a namespace identifier that identifies the respective corresponding protected namespace containing the non-volatile data to be read;
   receiving via the interface of the designated trusted boot firmware driver, by the given one of the multiple trusted boot firmware drivers that is the data owner the respective corresponding non-volatile data read from the respective corresponding protected namespace along with a hash-based message authentication code (HMAC) of the non-volatile data, which was stored within the respective corresponding protected namespace along with the respective corresponding non-volatile data owned by the given trusted boot firmware driver;
   recalculating, by the given trusted boot firmware driver that is the respective data owner of the respective corresponding non-volatile data on the first non-volatile memory, an HMAC of the respective corresponding non-volatile data read from the respective corresponding protected namespace;
   comparing, by the given trusted boot firmware driver that is the respective data owner of the respective corresponding non-volatile data on the first non-volatile memory, the recalculated HMAC of the non-volatile data to the HMAC of the respective corresponding non-volatile data stored within the respective corresponding protected namespace on the first non-volatile memory; and
   verifying, by the given trusted boot firmware driver that is the respective data owner of the respective corresponding non-volatile data on the first non-volatile memory, the integrity of the non-volatile data read from the respective corresponding protected namespace only if the recalculated HMAC of the non-volatile data read from the respective corresponding protected namespace matches the HMAC of the respective corresponding non-volatile data stored within the respective corresponding protected namespace on the first non-volatile memory.

17. The computer-implemented method as recited in claim 16, further comprising detecting by the given trusted boot firmware driver that is the designated data owner of the respective corresponding non-volatile data on the first non-volatile memory and the designated data owner of the respective corresponding protected namespace within the first non-volatile memory, tampering of the non-volatile data read from the protected namespace, if the recalculated HMAC of the non-volatile data does not match the HMAC of the respective corresponding non-volatile data stored within the respective corresponding protected namespace.

18. The computer-implemented method as recited in claim 17, wherein if tampering is detected, the computer-implemented method further comprises restoring, by the given trusted boot firmware driver that is designated as the data owner of the respective corresponding non-volatile data originally stored within the protected namespace, by fetching a copy of the respective corresponding non-volatile data from a separate trusted location that corresponds to the respective corresponding protected namespace containing the respective corresponding non-volatile data to be read; and using the fetched copy of the respective corresponding non-volatile data to replace or restore the respective corresponding non-volatile data previously stored within the respective corresponding protected namespace of the first non-volatile memory.

19. The computer-implemented method as recited in claim 16, further comprising using the respective corresponding non-volatile data read from the respective corresponding protected namespace only if the integrity of the respective corresponding non-volatile data is verified.

20. The computer-implemented method as recited in claim 16, wherein the first non-volatile memory is a Serial Peripheral Interface (SPI) flash memory chip.

21. The information handling system as recited in claim 1, wherein the first non-volatile memory is a Serial Peripheral Interface (SPI) flash memory chip.

22. The computer-implemented method as recited in claim 11, wherein the first non-volatile memory is a Serial Peripheral Interface (SPI) flash memory chip.

23. The computer-implemented method as recited in claim 11, where the receiving a data-write request from a given one of the untrusted or trusted boot firmware drivers includes receiving the data-write request from a given one of the untrusted boot firmware drivers.

24. The computer-implemented method as recited in claim 11, where the receiving a data-write request from a given one of the untrusted or trusted boot firmware drivers includes receiving the data-write request from a given one of the trusted boot firmware drivers.

* * * * *